B. J. REESE.
LAMP.
APPLICATION FILED FEB. 11, 1918.
1,308,809.
Patented July 8, 1919.
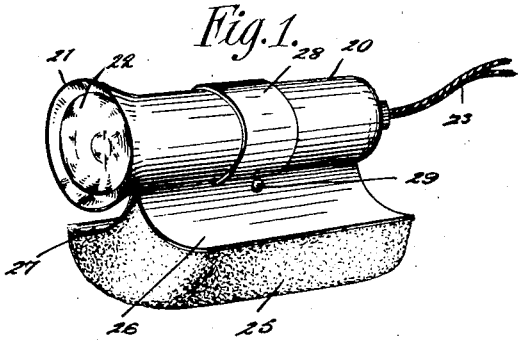
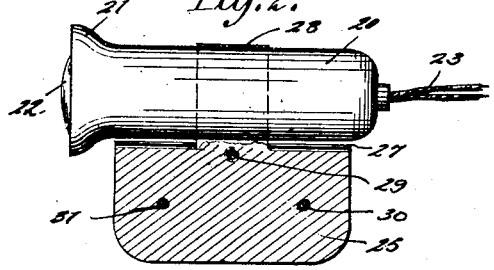
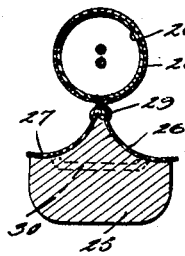
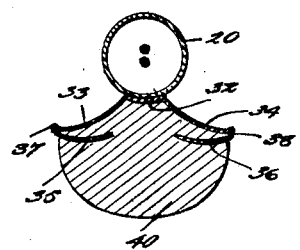
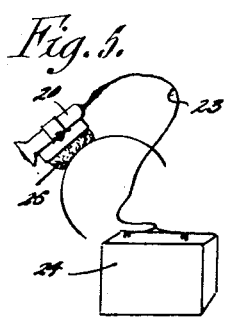
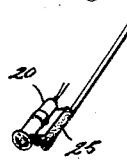
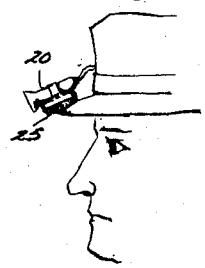
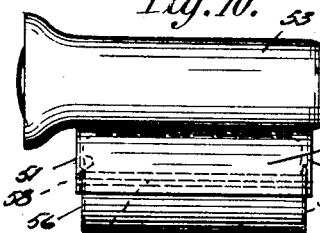
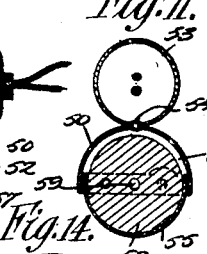
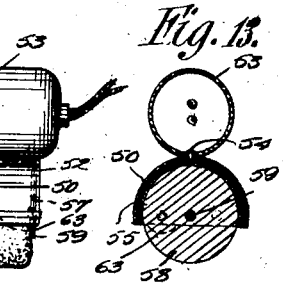
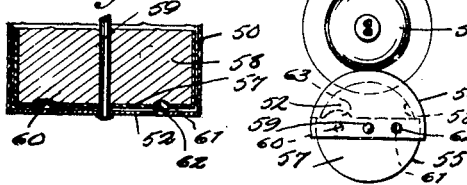
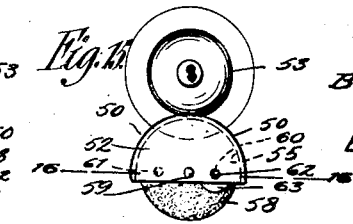
INVENTOR
Berthold J. Reese
BY Carl P. Goepel
ATTORNEY

UNITED STATES PATENT OFFICE.

BERTHOLD J. REESE, OF NEW YORK, N. Y.

LAMP.

1,308,809.  Specification of Letters Patent.  Patented July 8, 1919.

Application filed February 11, 1918. Serial No. 216,471.

*To all whom it may concern:*

Be it known that I, BERTHOLD J. REESE, a citizen of the United States, and resident of the borough of Manhattan, in the city, county, and State of New York, have invented certain new and useful Improvements in Lamps, of which the following is a specification.

The present invention relates to improvements in lamps, and has for an object to provide a portable lamp having practically universal adaptability, both as to the place of attachment, and the angle of directed light, to the end that the same will prove convenient and effective for numerous uses which have heretofore been served by matches, candles, lamps or the like, which were unhandy and inefficient in that they either could not be made to properly direct the light, or had to be carried or supported in such manner as to hamper the user, and prevent his having the use of both hands. Many uses, such as are contemplated for the present device will suggest themselves, a few such uses being hunting for objects in dark places, such as under desks, in safes, closets or the like, for plumbers, electricians, housewives, and furnishing light for repairing automobile engines where it is desirable to direct the light upon a small, and sometimes out of the way part, and where no means for supporting an ordinary lamp in such manner as to properly direct the light are available.

A further object of the invention is to provide such a device which will be simple and inexpensive to manufacture, will be convenient to carry, and will retain its usefulness for a practically indefinite period.

To accomplish these objects, I propose in the present embodiments of my invention to provide in combination with a source of light and preferably a small portable incandescent electric lamp, means capable of attachment and adaptability to any suitable supporting surface, and while I do not limit myself to the particular means disclosed herein, I find that a plastic adhesive substance, capable of being easily molded and which will retain these qualities for a relatively long period or substantially permanent, is the most desirable for the purpose. Such a substance is a prepared clay, sometimes used as modeling clay, which has the proper consistency to render it convenient to handle, will conform to various shapes, and will retain its plasticity by molding and forcing into contact with such shapes and the property of adhering or attaching itself to extraneous surfaces for a practically indefinite period.

With the above and other objects in view, embodiments of my invention are shown in the accompanying drawings, and these embodiments will be hereinafter more fully described with reference thereto, and the invention will be finally pointed out in the claims.

In the accompanying drawings;

Figure 1 is a perspective view of one embodiment of my improved invention;

Fig. 2 is a longitudinal vertical sectional view, partly in elevation;

Fig. 3 is a transverse vertical sectional view;

Fig. 4 is a similar view of a slightly modified form of construction;

Figs. 5 to 9 illustrate various uses to which the device may be put;

Fig. 10 is a side elevation of a further modified form of construction, showing the same when not in use;

Fig. 11 is a transverse vertical sectional view thereof;

Fig. 12 is a side elevation of the same, showing the attaching element exposed, and the lamp ready for use;

Fig. 13 is a transverse vertical sectional view thereof;

Fig. 14 is an end view of the device as shown in Fig. 10;

Fig. 15 is an end view of the same as shown in Fig. 12; and

Fig. 16 is a cross sectional view along the line 16—16 of Fig. 15, with parts broken away.

Referring to the drawings, and more particularly to Figs. 1 to 3 thereof, an embodiment of my invention shown therein comprises a lamp casing 20 of cylindrical form, but which may be of any suitable shape, provided in its forward open and flared end 21 with an electric incandescent lamp bulb 22, the inner surface of the flared portion 21 being preferably coated with a reflective substance, so as to form a reflector for the light. Interiorly the casing 20 is provided with the usual connection means for the lamp 22 and the conductors 23, which are of a suitable length to enable the lamp to have a sufficient latitude of movement about the source of supply of the electric current, the source of supply being preferably a small battery which may be carried in the pocket of the user. In Fig. 5, I have illustrated such a battery diagrammatically at 24.

The holder for the plastic and adhesive attaching element 25 is formed of sheet metal, and comprises a pair of flared side portions 26 and 27, the upper edges of which are bent outwardly from a ring portion 28 which embraces the lamp casing 20. This ring portion 28 may be soldered in place to prevent longitudinal movement, and the side portions are secured together by means of a rivet 29. The plastic and adhesive attaching element, which as above pointed out, consists preferably of a prepared clay, is forced between the side portions 26 and 27, and is held in place by means of a pair of cross pieces 30 and 31, which prevent separation of the attaching element from the lamp, and the same projects from the said side portions in the form of a pad. The cross pieces 30 and 31 are shown as comprising small wire pieces bent upwardly at their ends and soldered to the under side of the side pieces 26 and 27. These cross pieces may, however, be substituted by any suitable means for retaining the attaching element, such for instance, as prongs, lugs struck from the side portions 26 and 27, or the like.

In Fig. 4, I have shown a slightly modified form of construction, in which the retaining means for the attaching element comprises a longitudinal seat 32, to which the lamp casing 20 is soldered, and flared side portions 33 and 34 are bent outwardly from the said seat 32. These side portions are provided at their longitudinal edges with flanges 35 and 36, bent inwardly and beneath the said side portions, and spaced therefrom. The edges 37 and 38 may be curled if desired to provide a smooth non-scratching surface. The attaching element 40 is held in place upon the retaining means by means of the flanges 35 and 36.

In Figs. 5 to 9, I have illustrated a few of the uses to which the device may be put. The attaching element 25 enables the lamp to be attached to a surface of any shape or character, as for instance; a rough or smooth surface, a perforated surface, a wet or dry, or hot or cold surface, a corner, a point, a round surface, a perpendicular or inclined surface, and in fact any surface to which it may be desirable to attach a lamp. The attaching element, by reason of its plastic adhesive qualities, will shape itself to any shape surface, so that the lamp will be firmly held in place, and in addition, the plasticity enables the lamp to be positioned at any angle to properly direct the light.

Thus, in Fig. 5, I have shown a lamp as attached to a cylindrical surface. In Fig. 6, the same is shown attached to a perpendicular surface, and the lamp turned at a slight angle, while in Fig. 7 the same is shown attached to a corner or point. Fig. 8 shows the device attached to the end of a stick, such a use being desirable in examining out of the way places, which cannot be reached by the hand, and Fig. 9 shows the device attached to a man's cap. Numerous other uses will suggest themselves.

In Figs. 10 to 16, I have illustrated a further modified form of my invention, in which the attaching element is inclosed in a casing when not in use, so that it may be conveniently carried in the pocket. A casing 50, slightly more than a semi-circle in cross section, inclosed at its ends 51 and 52, is secured to the lamp casing 53 by means of rivets 54. A similar shaped casing 55 also closed at its ends 56 and 57, but of a length and diameter which will enable it to fit into the casing 50, is filled with the attaching substance 58, which projects from the same in the form of a pad, as shown in Figs. 12 and 13, and the casing 55 is rotatably connected to the casing 50 by means of a spindle 59, which also serves to retain the attaching substance within the said casing 55. Thus, it will be seen, that in the closed position shown in Figs. 10, 11 and 14, the attaching substance is entirely covered.

By rotating the casing 55 into the casing 50, the same assumes a position as shown in Figs. 12 and 13, and the attaching substance projects from the casing so that the device may be used in a similar manner to the construction shown in Figs. 1 to 4.

In order to retain the casing 55 in its respective positions, indentations 60 and 61 are provided on the end 56 thereof, and upon the end 52 of the outer casing 50 there is provided a single indentation 62. Beneath the indentation 61 there is provided a small extension end 57, for the purpose of enabling the disengagement of the indentation 61 from indentation 62. In the closed position shown in Fig. 14, where the indentation 60 engages the indentation 62, disengagement may be brought about by pressing the end 57 beneath the said indentation 60.

Should the plastic substance projecting from the casing 55 become spread while it is in use, the same may be very readily worked back to its original shape, so that it will enter the casing 50, when it is desired to close the device.

I have illustrated preferred and satisfactory embodiments of my invention, but it is obvious that changes may be made therein within the spirit and scope thereof, as defined in the appended claims.

I claim:

1. In combination, a lamp, a moldable adhesive attaching element formed of plastic material, and means secured to said lamp and partially embracing said attaching element to form a holder for said attaching element.

2. In combination, a lamp, a moldable adhesive attaching element formed of plastic material, and means secured to said lamp and partially embracing said attaching element to form a holder for said attaching element, and retention means secured to said holder and extending into the body of said plastic attaching element.

3. In combination, a lamp, a moldable adhesive attaching element formed of plastic material, and a container for said attaching element comprising a pair of flared flanges extending from said lamp at each side thereof.

4. In combination, a lamp, a moldable adhesive attaching element, means constituting a holder for said attaching element and means for inclosing said attaching element when not in use.

5. In combination, a lamp, a moldable adhesive attaching element, a cover member attached to said lamp, a revoluble container member containing said attaching element, said container member adapted to be revolved with respect to said cover member, to respectively expose and cover said attaching element.

6. In combination, a lamp, a supporting surface, and a moldable, adhesive, attaching element disposed between said lamp and said supporting surface, means secured to said lamp and constituting a holder for said attaching element, the moldability of said attaching element adapted to permit of changing the angle of said lamp with relation to said supporting surface to direct the light from said lamp at different angles.

7. In combination, a portable lamp, a portable battery, a flexible elongated conductor connecting said lamp to said battery, a moldable adhesive attaching element, and means secured to said lamp and constituting a holder for said attaching element.

In testimony that I claim the foregoing as my invention, I have signed my name.

BERTHOLD J. REESE.